United States Patent [19]

Inoue et al.

[11] Patent Number: 4,955,831
[45] Date of Patent: Sep. 11, 1990

[54] IGNITION TIMING CONTROL SYSTEM FOR OUTBOARD ENGINE

[75] Inventors: Seiji Inoue; Seiichi Tanaka, both of Hamamatsu, Japan

[73] Assignee: Sanshin Kogyo Kabushiki Kaisha, Hamamatsu, Japan

[21] Appl. No.: 325,294

[22] Filed: Mar. 17, 1989

[30] Foreign Application Priority Data

Mar. 18, 1988 [JP] Japan .................................. 63-65492

[51] Int. Cl.$^5$ ............................................ B63H 21/22
[52] U.S. Cl. ............................................ 440/1; 440/61
[58] Field of Search ................. 440/1, 2, 61; 123/329, 123/340; 180/277

[56] References Cited

U.S. PATENT DOCUMENTS 4,734,065  3/1988  Nakahama et al. .................... 440/1

Primary Examiner—Joseph F. Peters, Jr.
Assistant Examiner—Jesûs D. Sotelo
Attorney, Agent, or Firm—Ernest A. Beutler

[57] ABSTRACT

An arrangement for insuring that an internal combustion engine of an outboard motor will operate efficiently under all trim adjusted conditions of the outboard motor. If it is sensed that a change in trim angle will adversely effect the running, for example, by varying the air/fuel ratio, the timing is adjusted to provide good running in response to the trim condition.

5 Claims, 7 Drawing Sheets

IGNITION TIMING CONTROL SYSTEM FOR OUTBOARD ENGINE

BACKGROUND OF THE INVENTION

This invention relates to an ignition timing control system for an outboard engine and more particularly to an engine control for an outboard engine that will maintain the running condition of the engine uniform regardless of the trim adjusted angle.

As is well known, outboard motors are normally mounted on the transom of a watercraft and are adjustable through a plurality of trim adjusted ranges so as to insure that the angle of attack of the propeller is proper for all running conditions. Although the trim adjustment relative to speed of the watercraft improves the efficiency of the propulsion unit, the adjustment of the trim of the outboard motor can effect its running characteristics. For example, if the engine is employed with a conventional type of carburetor having a float bowl that maintains a uniform head of fuel for carburation purposes, the fuel head will vary as the trim adjusted condition changes and the air/fuel ratio can vary with the trim adjusted position. Of course, variations in air/fuel ratio dictate changes in spark timing in order to insure optimum engine performance. However, the spark timing of an engine is normally controlled as a function of speed and/or load.

It is, therefore, a principal object of this invention to provide an improved control for an outboard motor wherein the running of the engine is stabilized depending upon the trim adjusted condition of the outboard motor.

It is a further object of this invention to provide an engine control for an outboard motor that insures efficient running of the engine under all trim adjusted conditions.

SUMMARY OF THE INVENTION

This invention is adapted to be embodied in an engine control for an outboard motor that is adapted to be mounted for trim adjustment of the position of the outboard motor. In accordance with the invention, means are provided for sensing when a change in the trim condition of the outboard motor will effect a change in a running characteristic of the engine and means are provided for adjusting the running characteristic of the engine in response to the sensed trim condition.

DETAILED DESCRIPTION OF THE PREFERRED EMBODIMENTS OF THE INVENTION

Figure 1:
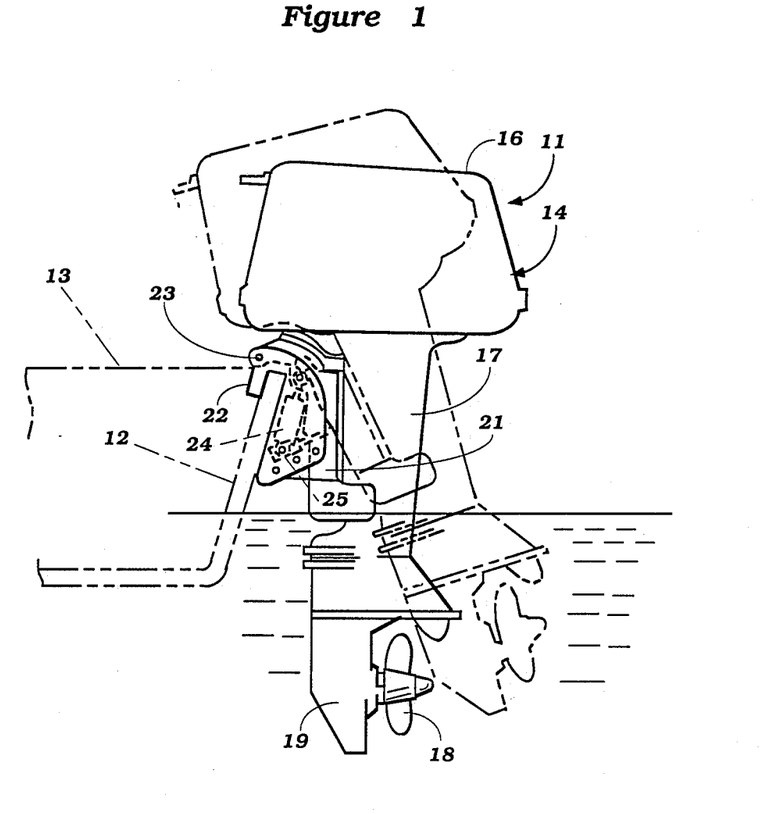
FIG. 1 is a side elevational view of an outboard motor as mounted on the transom of a watercraft and incorporating an embodiment of the invention.
Figure 2:
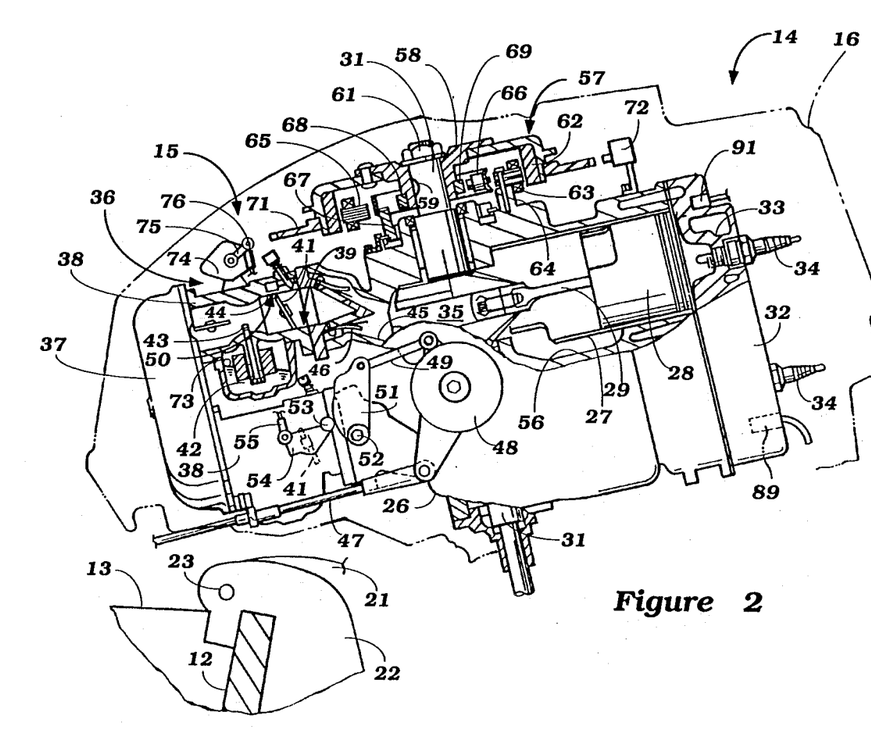
FIG. 2 is an enlarged side elevational view of the power head and mounting arrangement, with portions broken away and other portions shown in section.

Referring first to FIG. 1, an outboard motor, indicated generally by the reference numeral 11 and which has a control system constructed in accordance with an embodiment of the invention is mounted on a transom 12 of a watercraft 13. The outboard motor 11 is comprised of a power head, indicated generally by the reference numeral 14 and which comprises an internal combustion engine 15 as shown in FIG. 2 and a surrounding protective cowling, shown in phantom in this figure and identified by the reference numeral 16. As will be described in more detail, the engine 15 has an output shaft that drives a drive shaft journaled in an appropriate manner in a drive shaft housing 17 and which drives a propeller 18 of a lower unit 19 through an appropriate forward, neutral, reverse transmission (not shown).

A steering shaft (not shown) is affixed to the drive shaft housing 17 and is journaled for steering movement about a generally vertically extending steering axis within a swivel bracket 21. The swivel bracket 21 is, in turn, connected for pivotal movement to a clamping bracket 22 by means of a pivot pin assembly 23 for tilt and trim adjustment of the outboard motor 11.

In order to effect this tilt and trim adjustment, there is provided a tilt cylinder assembly 24 that is interposed between the clamping bracket 22 and the swivel bracket 21. In addition, there is provided a trim motor 25 that is carried by the clamping bracket 22 and which operates with the swivel bracket 21 so as to effect trim adjustment. The trim adjustment of the outboard motor 11 is through a relatively narrow range as shown by the solid and phantom line figures in FIG. 1 so as to adjust the angle of attack of the propeller 18 relative to the transom 12 so as to accommodate different running conditions and provide the optimum thrust. The tilt fluid motor 24 may be operated so as to raise the outboard motor 11 to an elevated out of the water condition. The hydraulic systems employed for this purpose are well known and since they form no part of the invention, description of them is not believed to be necessary to understand the operation of the invention.

Referring now in detail to FIG. 2, the internal combustion engine 15 is depicted as being of the two cylinder in line, crankcase compression, two cycle type. It is to be understood, of course, that the invention may be utilized in conjunction with other types of engines than two cycle type and also engines having different numbers of cylinders, different cylinder configurations and, in fact, rotary type engines.

In the illustrated embodiment, the engine 15 is comprised of a cylinder block 26 in which a pair of cylinder liners 27 (only one of which appears in this figure) extend in a horizontal direction, as is conventional outboard motor practice, to slidably support a respective piston 28. Each piston 28 is connected by means of a respective connecting rod 29 to a crankshaft 31 which rotates about a generally vertically extending axis and which drives the drive shaft, as aforenoted.

A cylinder head 32 is affixed to the cylinder block 26 in a known manner and defines a pair of recesses 33 each of which cooperates with a respective one of the cylinder bores and pistons 28 so as to define the combustion chamber. A spark plug 34 is mounted in the cylinder head 32 with its gap extending into the combustion chamber recess 33 for each cylinder.

The crankshaft 31 is rotatably journaled in a crankcase formed by the cylinder block 26 and which is formed with individual sealed chambers 35 for each piston 26. A fuel/air mixture is delivered to these chambers 35 by means of an induction and charge forming system, indicated generally by the reference numeral 36. This induction and charge forming system includes an air inlet device 37 that draws air from within the protective cowling 16 and delivers it to a pair of carburetors 38. Each carburetor 38 is comprised of a respective induction passage 39 in which a flow controlling throttle valve 41 is supported in a known manner. A fuel bowl 42 is maintained with a constant head of fuel by means of a float operated valve and supplies fuel to a main discharge nozzle 43 that is positioned in a venturi section of the induction passage of the carburetor 38 upstream of the throttle valve 42. In addition, the carburetors 38 are provided with an idle and transition fuel discharge circuit 44 of a known manner. An idle adjusting screw 50 is provided for adjusting the flow of the idle discharge circuit.

The carburetors 38 deliver the fuel/air mixture to an intake manifold having individual runners 45 that discharge into the crankcase chambers 35. Reed type check valves 46 preclude reverse flow through the manifold runners 45, as is well known in this art.

The position of the throttle valves 41 and, accordingly, the speed of the engine 15 is controlled by a throttle control system including a throttle control cable 47 that extends to a remotely positioned throttle actuator (not shown) and which rotates a throttle controlled drum 48 that is journaled on the cylinder block 26 in an appropriate manner. A control link 49 is pivotally connected at one end to the drum 48 and at the other end to a control cam 51 which is, in turn, journaled upon the intake manifold by means of a pivot pin 52. The throttle control cam 51 cooperates with a follower 53 that is affixed to a lever 54 which is, in turn, affixed to the shaft of the throttle valve 41 for positioning the throttle valve 41 upon rotation of the cam 51. The throttle valves 41 of the respective carburetors are connected to each other for simultaneous movement by means of a link 55 that is pivotally connected to the throttle control levers 54 of the respective carburetors.

The fuel/air charge which is delivered to the crankcase chambers 35 by the carburetors 38 is transferred upon descent of the pistons 28 into the combustion chambers 33 by transfer or scavenge passages 56 in a known manner. At the appropriate time, as will become apparent, the spark plugs 34 are fired. The firing power for the spark plugs 34 is derived from a magneto generator, indicated generally by the reference numeral 57 and which includes a flywheel 58 that is affixed to the crankshaft 31 for rotation with it by a key 59 and nut 61. The flywheel 58 carries a plurality of permanent magnets 62 that cooperate with a charging coil 63 that is affixed to a boss 64 of the cylinder block 26 in proximity thereto. In addition, the magneto generator 57 may include generating coils 65 for charging a battery (not shown) in a known manner.

There is provided further a trigger or pulser coil 66 that is mounted on a mounting ring 67 and which cooperates with magnet segments 68 and 69 so as to provide a signal when the crankshaft 31 is at a particular crank angle, which may be considered to be the fixed timing angle for the engine.

The engine 15 may also be provided with an electric starter including a starter ring gear 71 that is affixed to the flywheel 58 and which is driven by a suitable starter motor (not shown). A further sensor coil 72 may be associated with the teeth of the starter gear 71 for providing a signal that is indicative of the actual rotational angle of the crankshaft 31, for a reason to be described.

As has been noted, the outboard motor 11 is supported for trim adjusting movement and FIG. 2 of the drawings shows the engine 15 in a condition when the outboard motor 11 is adjusted to its maximum trim up condition as shown in the phantom line view of FIG. 1. As may be seen, the fuel level 73 in the fuel bowl 42 will shift as the trim adjustment changes and this will change the head of fuel for both the main discharge nozzle 43 and also the idle and transition system 44. As a result, the running of the engine can be changed by changing of the trim angle of the outboard motor 11. In accordance with the invention, there is provided an arrangement wherein the timing of the firing of the spark plugs 34 is adjusted in response to a variety of parameters so as to insure even running under all these conditions.

One of the parameters for controlling the timing is the throttle valve position or air flow. There is, therefore, provided an air flow sensor, indicated generally by the reference numeral 74 which is comprised of a potentiometer type device that has an input arm 75 that is connected by a link 76 to the throttle valve actuating link 55 so as to provide an output signal indicative of position of the throttle valves 41 and, accordingly, the air flow to the engine.

Figure 3:
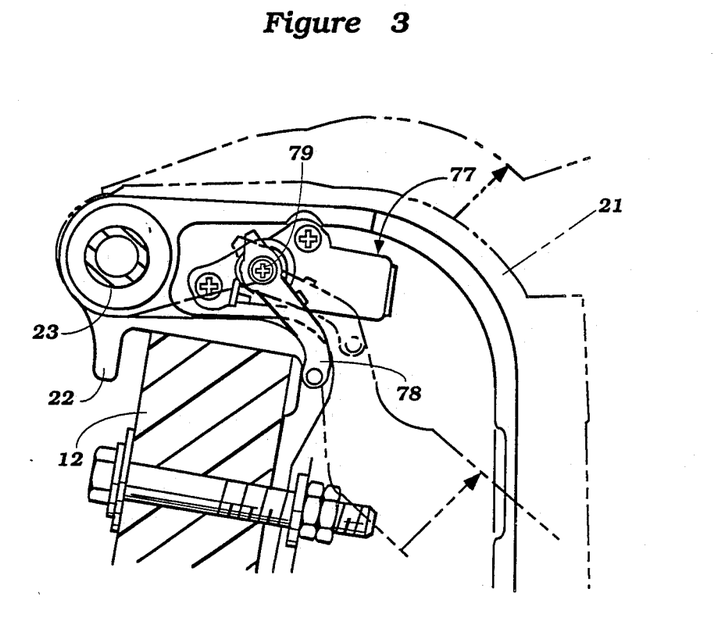
FIG. 3 is a still further enlarged cross-sectional view showing the trim angle sensor.

This sensing system includes further a trim position sensor, indicated generally by the reference numeral 77 and shown in most detail in FIG. 3. The sensor 77 is also a potentiometer type of device and is affixed to the swivel bracket 21 and has a wiper arm 78 that is affixed to a shaft 79 of the device 77 and which engages the transom 12 or clamping bracket 23 so as to provide an output signal indicative of trim adjusted position.

Figure 4:
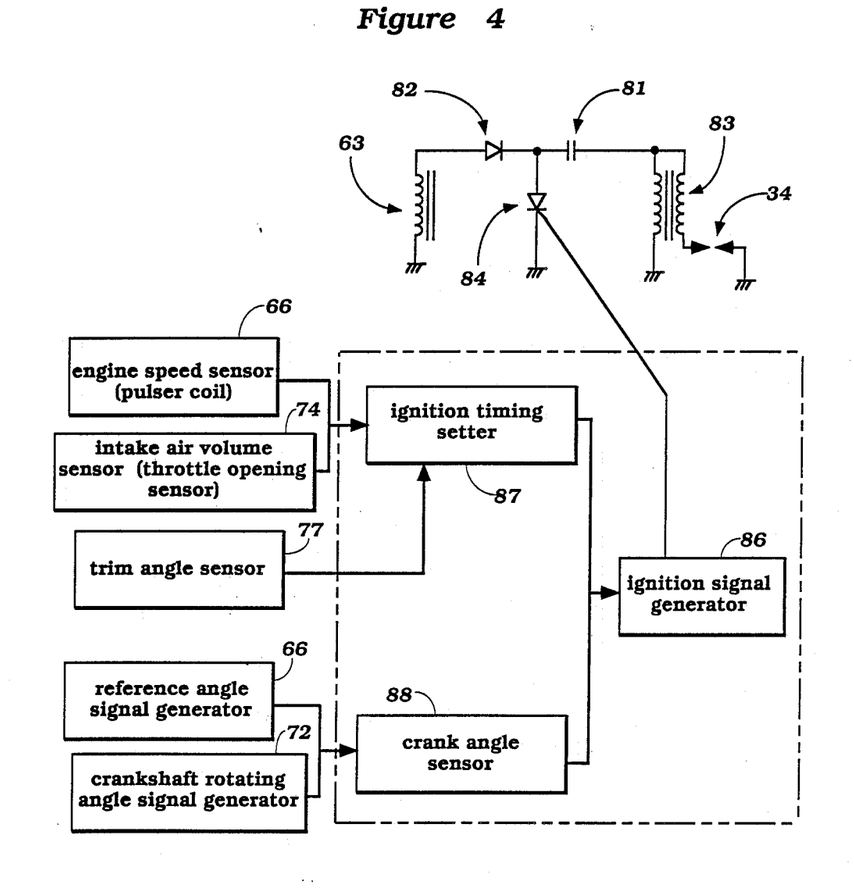
FIG. 4 is a schematic view showing the ignition control.

How these inputs are related to the ignition timing may be best understood by initial reference to FIG. 4 wherein the ignition system and control system for the engine is depicted.

The ignition system is of the SCR capacitor discharge type and includes a charging capacitor 81 that is charged by the charging coil 63 through a rectifying diode 82. The charging capacitor 81 is in circuit with a primary winding of an ignition coil 83, the secondary winding of which is in circuit with the spark plug 34. When the charging capcitor 81 is charged by the charging coil 63, it may be discharged by activating an SCR 84 by appropriately controlling its gate so as to ground the circuit and permit the capacitor 81 to discharge and induce a voltage in the secondary winding of the coil 83 sufficient to fire the spark plug 34.

The timing of the firing of the spark plug 34 is controlled by means of a controller system, indicated generally by the reference numeral 85 and which includes an ignition signal generator 86 that appropriately gates the SCR 84 to fire the spark plug 34 at the appropriate time.

The inputs to the controller 85 include the output signal from the pulser coil 66 which, in one condition indicates the engine speed and this engine speed along with the throttle opening as determined by the sensor 74 or air flow is fed into an ignition timing setter 87. The ignition timing setter 87 also receives a signal from the trim angle sensor 77 so as to appropriately adjust the timing of the ignition depending on the trim angle, in the manner to be described.

In addition to the information regarding engine speed, error intake volume or throttle position and trim angle, there is also provided a crank angle signal to the ignition signal generator from a crank angle sensor 88. The crank angle sensor 88 receives information from the sensor 72 of crank angle as well as the information from the pulser coil 66 and outputs its signal to the ignition signal generator 86 so that the ignition signal generator will generate the spark firing at the appropriate time depending upon the aforenoted variables.

In addition to the inputs already described, the ignition timing setter 87 may also adjust the ignition timing in response to certain other parameters of the engine such as its temperature as indicated by a temperature sensor 89 (FIG. 2). Furthermore, there may be provided a knock detector 91 which is also mounted in the cylinder head 32 and which can provide an output signal to the system so as to avoid knocking. The invention, however, is directed primarily toward the arrangement by which the ignition timing is adjusted in response to trim angle and it is believed obvious that those skilled in the art will understand how to apply this principle to any known type of ignition systems having controls for the aforenoted purposes.

Figures 5, 6:
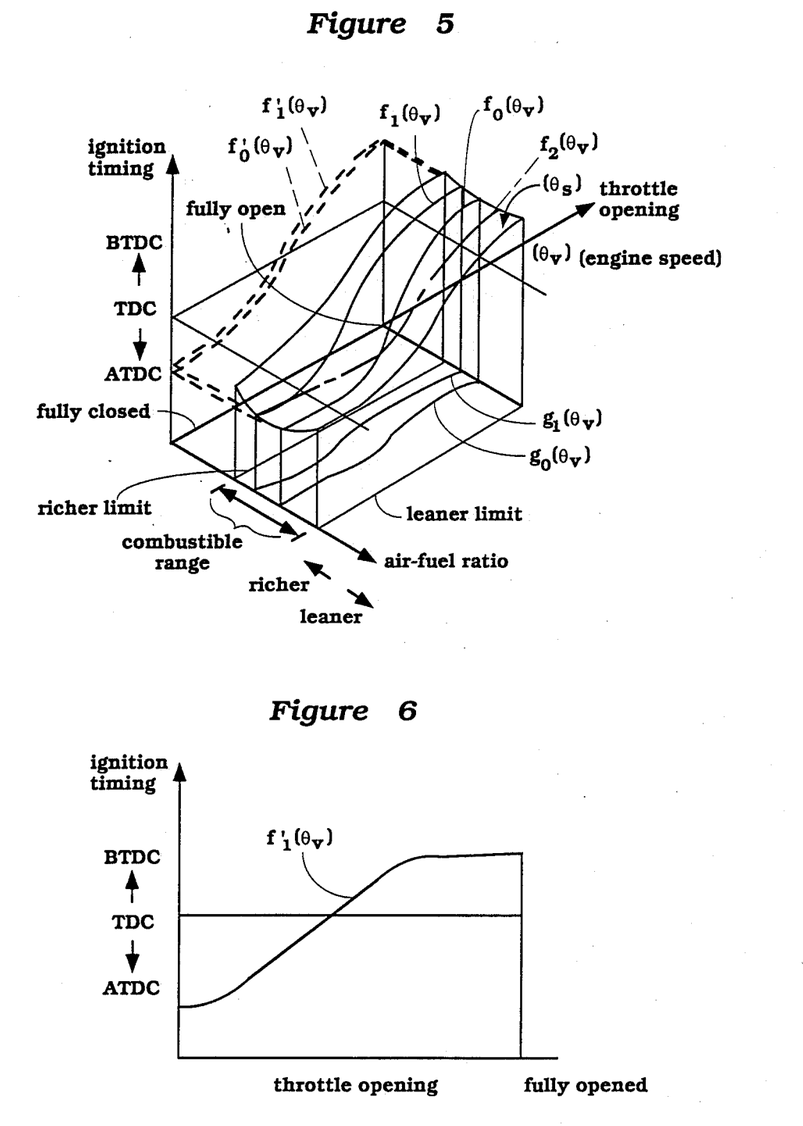
FIG. 5 is a graphical view showing the relationship of optimum ignition timing with respect to throttle position and air/fuel ratio.
FIG. 6 is a graphical view showing the relationship of spark timing to throttle opening.

FIG. 5 is a three dimensional, graphical analysis that shows how the various factors aforenoted determine the desirable spark timing. There is shown the optimum spark timing curve in relation to throttle opening or engine speed and also the fuel/air mixture ratio. The fuel/air mixture ratio, as aforenoted, will vary with the trim angle and it can be seen that the optimum spark timing depends upon all of these variables. During a central portion of the range of the air/fuel ratio which covers normal trim condition, the spark timing curve is as shown in FIG. 6 which constitutes a development of the spark timing curve on the XY plane having the throttle opening on the ordinate and the spark timing on the abscissa. As is typical, the optimum spark advance is at a first amount during low engine speeds, the spark advance progressively increases as the engine speed increases and then is held constant at a speed something less than maximum engine speed. Within a narrow range of the optimum fuel/air ratio, the spark timing curve generally follows the same pattern and does not deviate significantly. However, as the air/fuel ratio moves off toward the rich or lean side from the center point, a result of adjustment of the trim position, the optimum spark timing actually calls for an advance from the normal spark timing. The system, as will now be described, is effective to provide this advance in spark timing so as to insure good running under all conditions.

Figure 7:
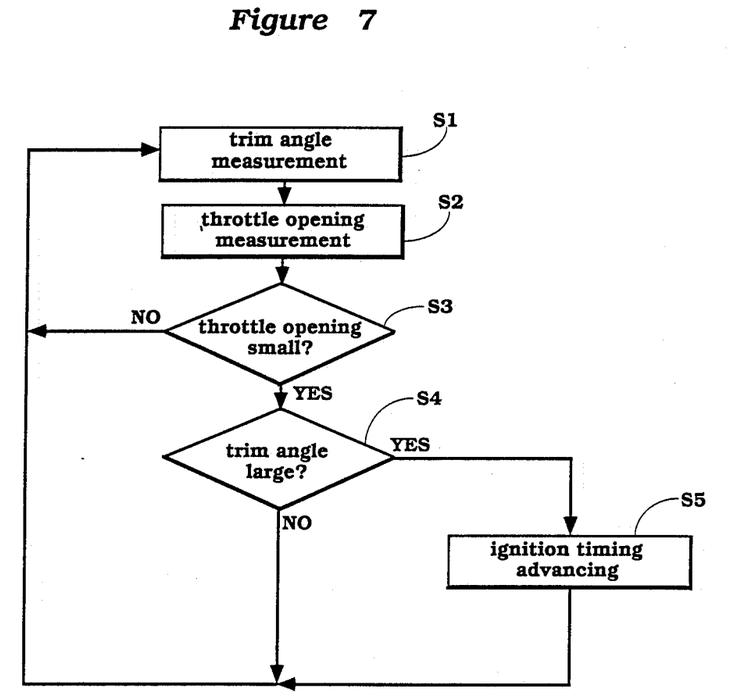
FIG. 7 is a block diagram showing the operation of an embodiment of the invention.

One possible routine of operation by which the spark advance may be accomplished is shown in FIG. 7. The basic operation of the embodiment as shown in FIG. 7 is that the trim angle and throttle opening are measured and if the throttle opening is large indicating that there is a likelihood that significant ignition timing adjustment is not required, the system will not provide any spark advance over the normal spark advance. However, if the throttle opening is small and the trim angle variation is large, then the spark timing will be adjusted.

Referring specifically to this figure, at the step S1 there is made a reading of the trim angle from the trim angle sensor 77. Simultaneously or after this, there is made a reading of the throttle opening or engine speed from the sensor 74. If it is determined that the throttle opening is large, the program moves at the step S3 back to the start step S1. If, however, the throttle opening is small, then at the step S4 the trim angle is compared to determine if there has been a large deviation in trim angle. If there is, the program moves to the step S5 so as to adjust the timing in accordance with the curve shown in FIG. 5. If, however, there is not a large trim angle variation, it is determined that the air/fuel ratio will be within the acceptable range and no spark advance is accomplished.

Figure 8:
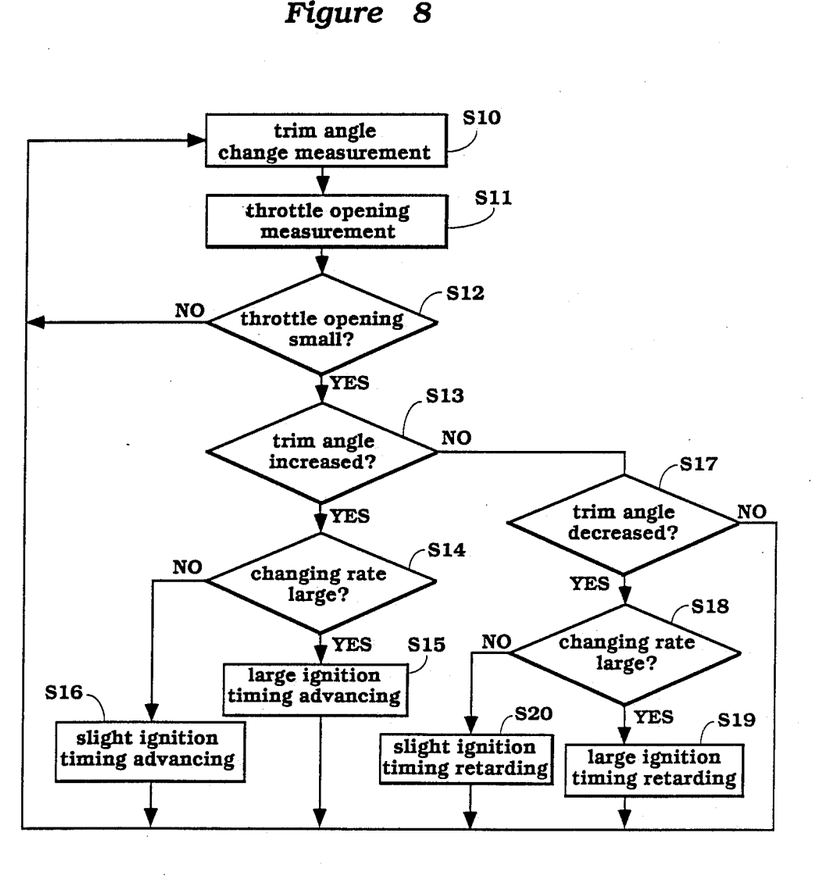
FIG. 8 is a block diagram showing the operation of another embodiment of the invention.

FIG. 8 shows another possible routine of operation wherein the same basic concept is followed, but in this case the rate of change of the trim angle is measured and if the rate of change of trim angle is large then the spark timing is changed at a rapid rate, whereas if the rate of change is small the spark is changed at a more reduced rate.

Referring in detail to FIG. 8, at the step S10 the trim angle is measured and at the step S11 the throttle opening is measured. At the step S12 if it is determined that there is not a small throttle opening, for the reasons as aforenoted, the program moves back to the step S10 and repeats.

If, however, the sensor 74 has indicated that there is a small throttle opening, the program moves to the step S13 to see if the trim angle is being increased.

If it is determined at the step S13 that the trim angle is being increased, the program moves to the step S14 to see if the rate of change is large or small. If the rate of change is large, the program moves to the step S15 to advance the ignition timing in a large degree and at a rapid rate. If, however, the rate of change is small, then the program moves to the step S16 so as to cause a slight ignition timing advance.

If at the step S13, it is determined that the trim angle is not being increased the program moves to the step S14 to determine if the trim angle is being decreased. If it is not, the program moves back to the start. If, however, it is determined that the trim angle is being decreased, the rate of change of trim angle is determined at the step S18. If the rate of change is large, then the program moves to the step S19 to provide a large ignition timing retard. If, however, the rate of decrease is small the program moves to the step S20 so as to cause a slight ignition retardation.

Although two embodiments of programs have been described, as aforenoted, various other changes may be made without departing from the spirit and scope of the invention, as defined by the appended claims.

We claim:

1. In an engine control for an outboard motor including an engine and adapted to be mounted for trim adjustment of the position of the outboard motor, the improvement comprising means for sensing when a change in trim condition of the outboard motor effects a change in a running characteristic of the engine from normal running and means for adjusting the running characteristic of the engine by adjusting a running system of the engine in response to the sensed condition to maintain normal running of said engine even when the trim condition is changed.

2. In an engine control as set forth in claim 1 wherein the running system comprises the spark advance system.

3. In an engine control as set forth in claim 2 wherein the engine is provided with a fuel supply system in which the air fuel ratio may vary in response to the trim angle.

4. In an engine control as set forth in claim 3 wherein the fuel supply system comprises a float operated device.

5. In an engine control as set forth in claim 4 wherein the float operated device comprises a carburetor.

* * * * *